13 Sheets--Sheet 1.
J. HATFIELD.
Paper Bag-Machine.
No. 166,988.  Patented Aug. 24, 1875.
Attest.  Inventor.
N. B. Smith  James Hatfield
F. B. Townsend  By his atty
  R. D. O. Smith
Fig. 1.
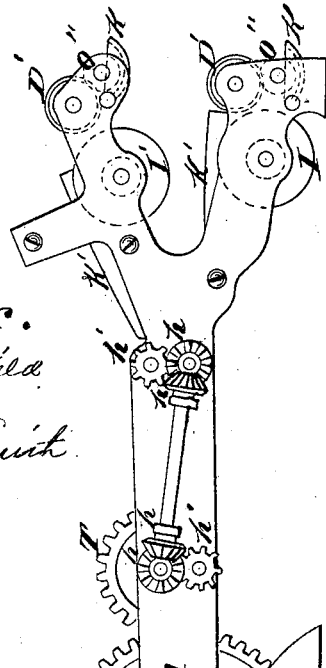
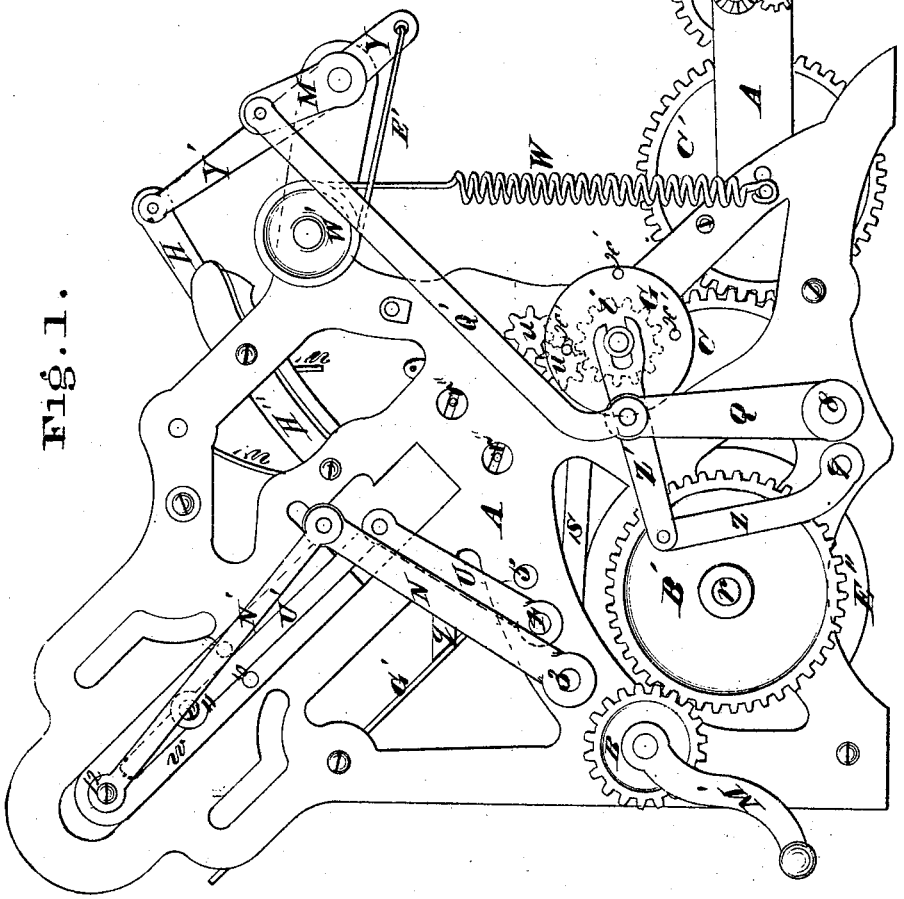

13 Sheets--Sheet 2.
J. HATFIELD.
Paper Bag-Machine.
No. 166,988. Patented Aug. 24, 1875.
Fig. 2.
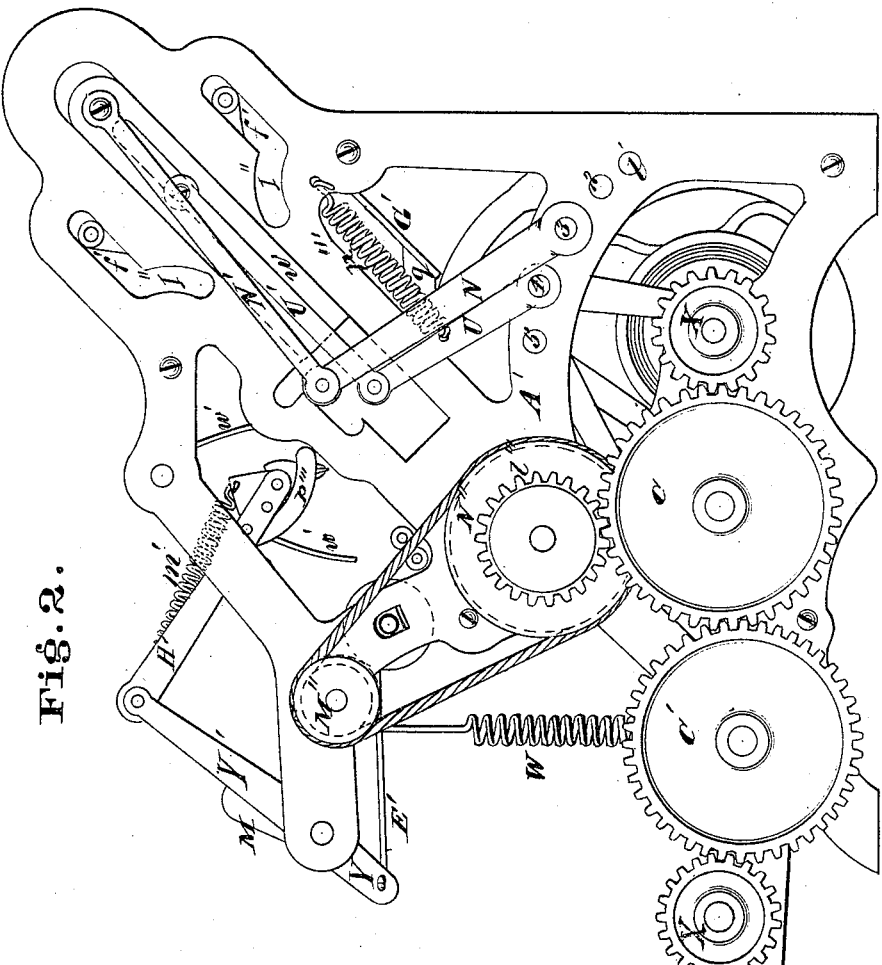
Attest.
N. B. Smith
F. B. Townsend
Inventor.
James Hatfield
By his atty
R. D. O. Smith
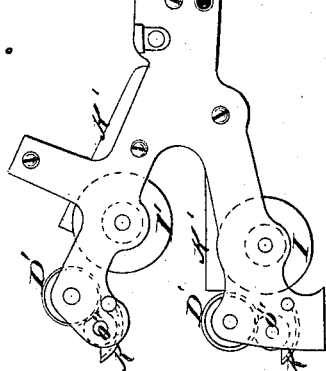

13 Sheets--Sheet 3.
J. HATFIELD.
Paper Bag-Machine.
No. 166,988. Patented Aug. 24, 1875.
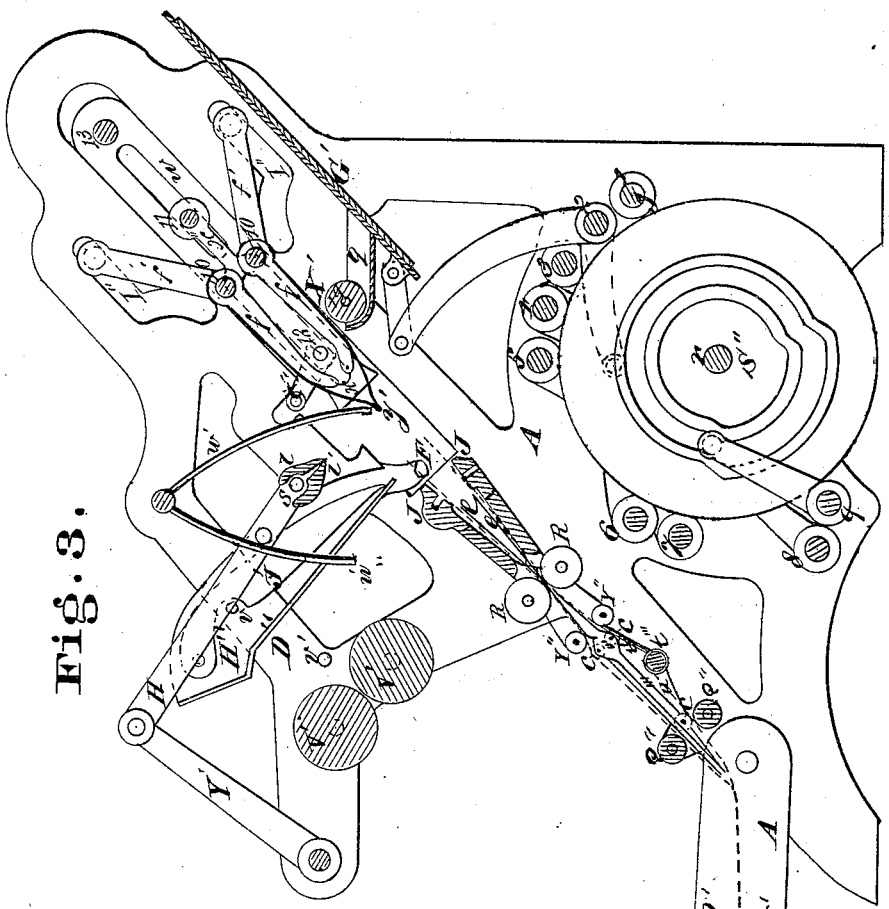
Fig. 3.
Attest.  
N. B. Smith  
F. B. Townsend
Inventor.  
James Hatfield  
By his atty  
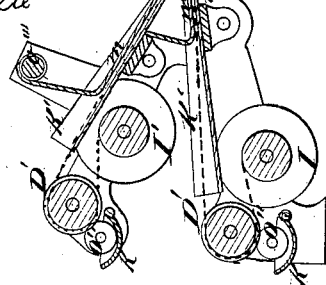

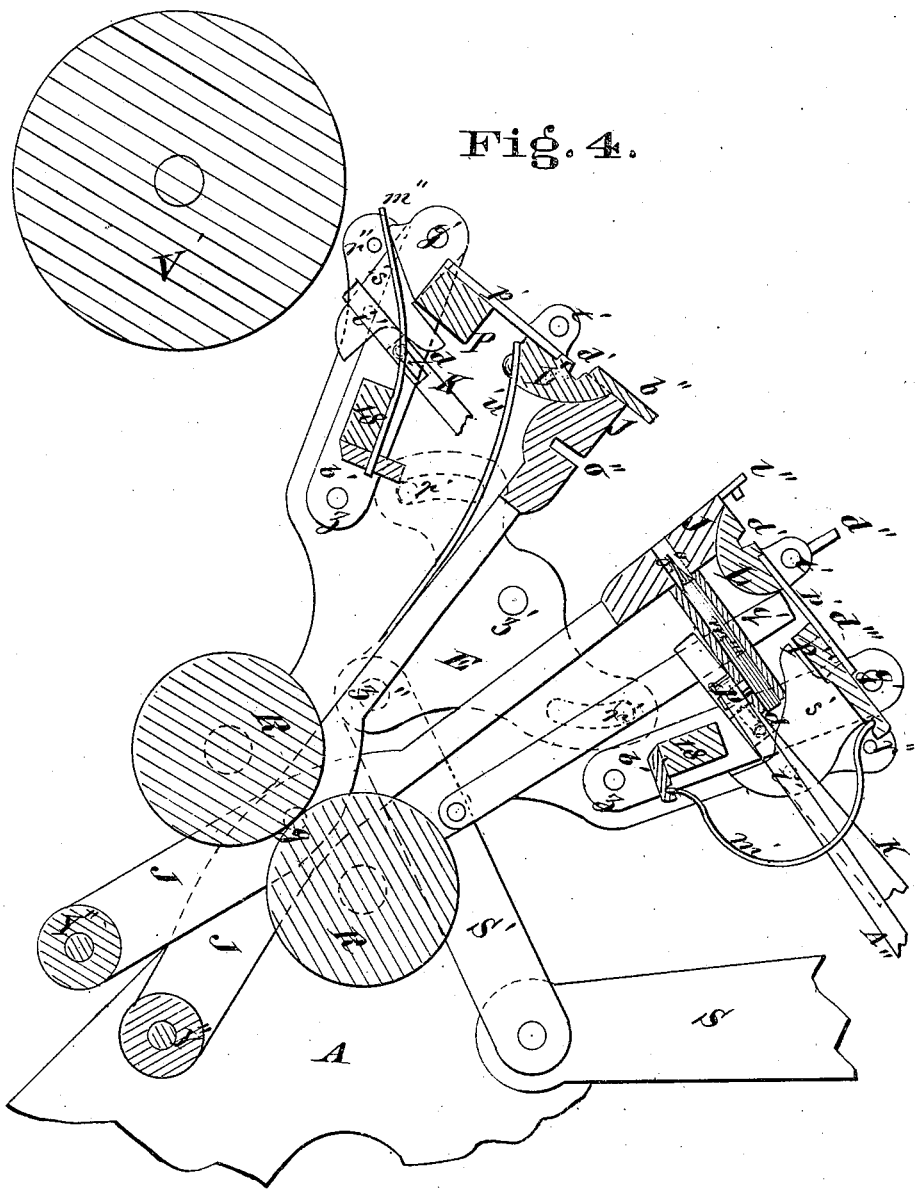

J. HATFIELD.
Paper Bag-Machine.
No. 166,988. Patented Aug. 24, 1875.
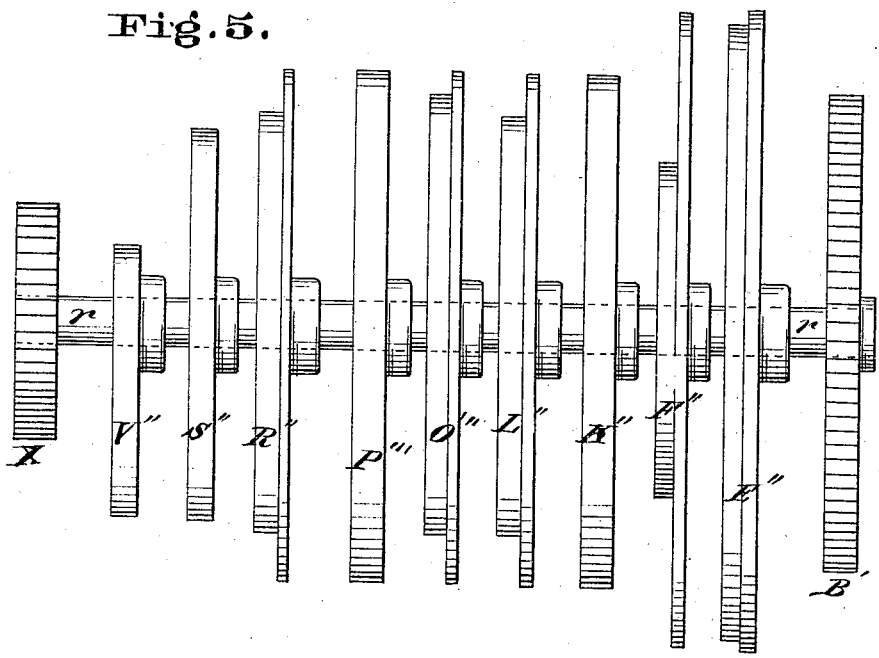
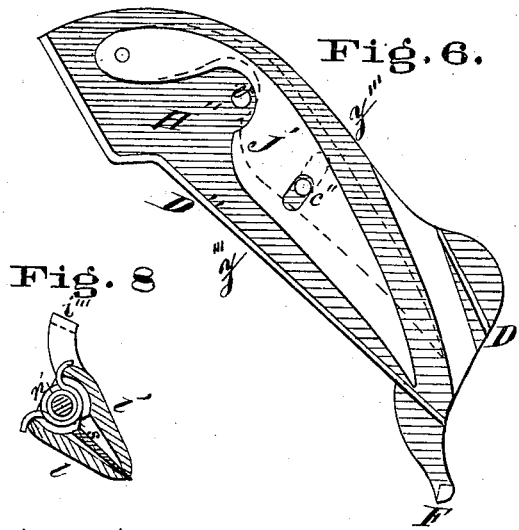
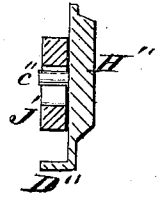
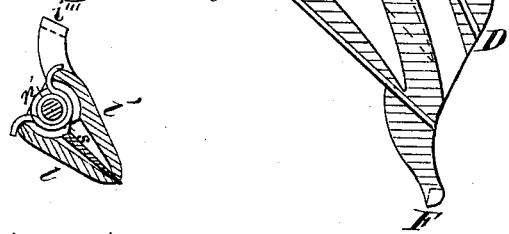

13 Sheets--Sheet 6.
J. HATFIELD.
Paper Bag-Machine.
No. 166,988.
Patented Aug. 24, 1875.
Fig. 9.
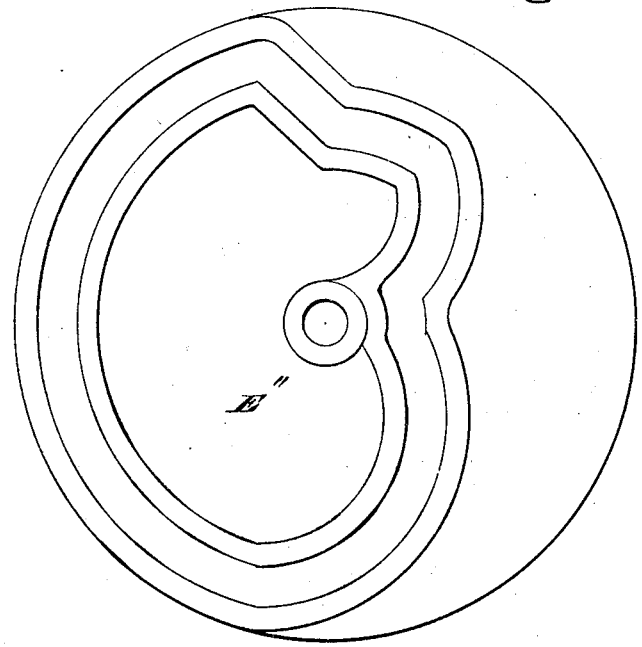
Fig. 10.
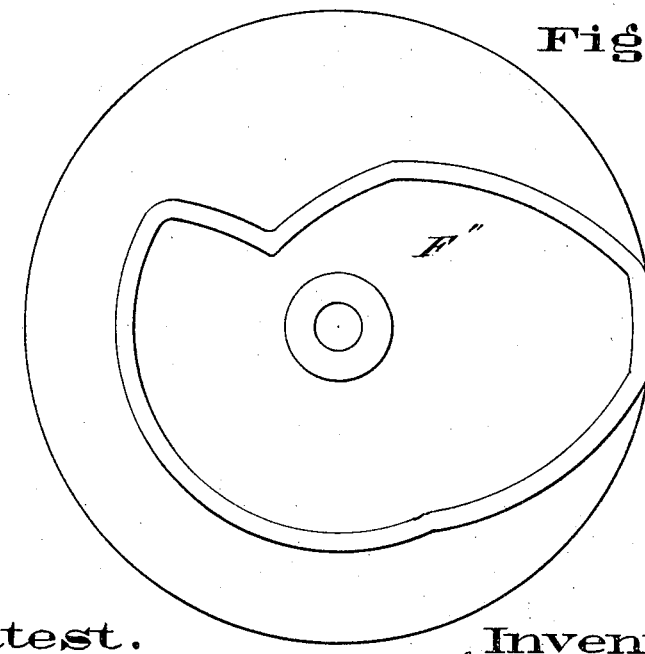
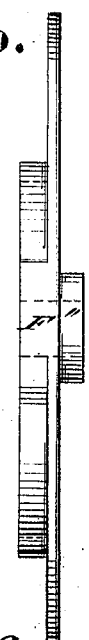
Attest.
N. B. Smith
F. B. Townsend
Inventor.
James Hatfield
By his atty R. D. O. Smith J. HATFIELD.
Paper Bag-Machine.

No. 166,988.

13 Sheets--Sheet 7.

Patented Aug. 24, 1875

Attest.
N. B. Smith
F. B. Townsend

Inventor.
James Hatfield
By his Atty

J. HATFIELD.
Paper Bag-Machine.
No. 166,988.
13 Sheets--Sheet 8.
Patented Aug. 24, 1875.

Fig. 15.  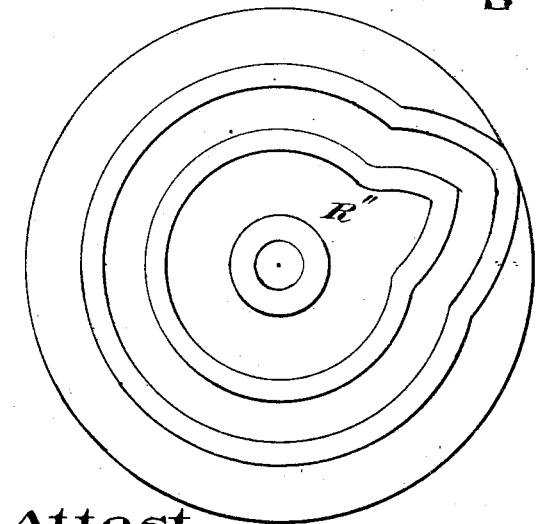 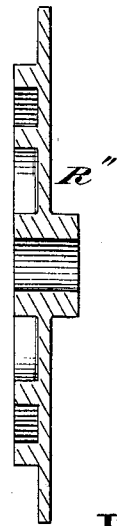
Attest.
N. B. Smith
F. B. Townsend
Inventor.
James Hatfield
By his Atty
C. D. O. Smith
N. PETERS, PHOTO-LITHOGRAPHER, WASHINGTON, D. C.

13 Sheets--Sheet 9.

J. HATFIELD.
Paper Bag-Machine.

No. 166,988. Patented Aug. 24, 1875.

Attest.
N. B. Smith
F. B. Townsend

Inventor.
James Hatfield
By his atty
R. D. O. Smith

J. HATFIELD.
Paper Bag-Machine.
No. 166,988.
Patented Aug. 24, 1875.
13 Sheets--Sheet 10.
Fig. 20. Fig. 21.
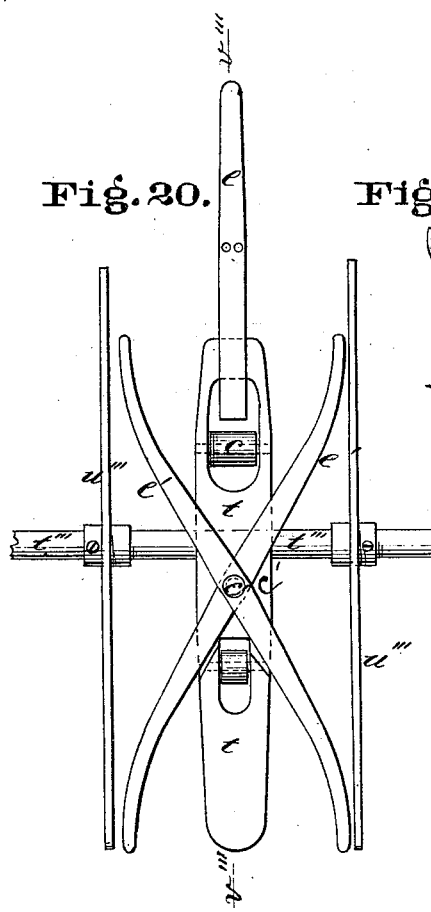
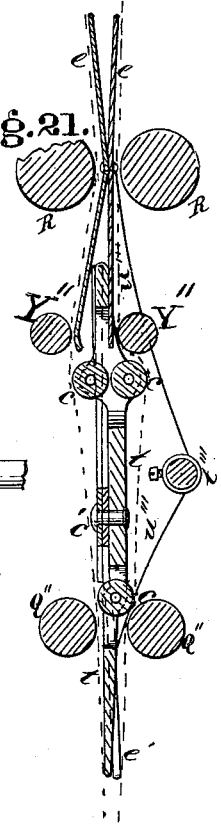
Fig. 22. Fig. 23.
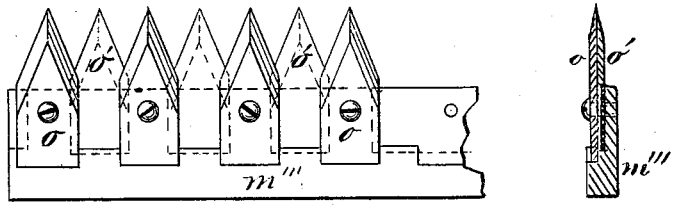
Attest.
N. B. Smith
F. B. Townsend
Inventor.
James Hatfield
By his Atty
R. D. O. Smith 13 Sheets--Sheet 11.

J. HATFIELD.
Paper Bag-Machine.

No. 166,988.          Patented Aug. 24, 1875.

Attest.
N. B. Smith
F. B. Townsend

Inventor.
James Hatfield
By his atty

J. HATFIELD.
Paper Bag-Machine.

No. 166,988.

13 Sheets--Sheet 13.

Patented Aug. 24, 1875.

Attest.
N. B. Smith
F. B. Townsend

Inventor.
James Hatfield
By his atty
R. D. Smith

N. PETERS, PHOTO-LITHOGRAPHER, WASHINGTON, D. C.

UNITED STATES PATENT OFFICE.

JAMES HATFIELD, OF CINCINNATI, OHIO.

IMPROVEMENT IN PAPER-BAG MACHINES.

Specification forming part of Letters Patent No. 166,988, dated August 24, 1875; application filed August 24, 1874.

CASE A.

*To all whom it may concern:*

Be it known that I, JAMES HATFIELD, of Cincinnati, in the county of Hamilton and State of Ohio, have invented a new and useful Improvement in Paper-Bag Machines; and I do hereby declare the following to be a full, clear, and exact description of the same, reference being had to the accompanying drawings, in which—

Figure 11:
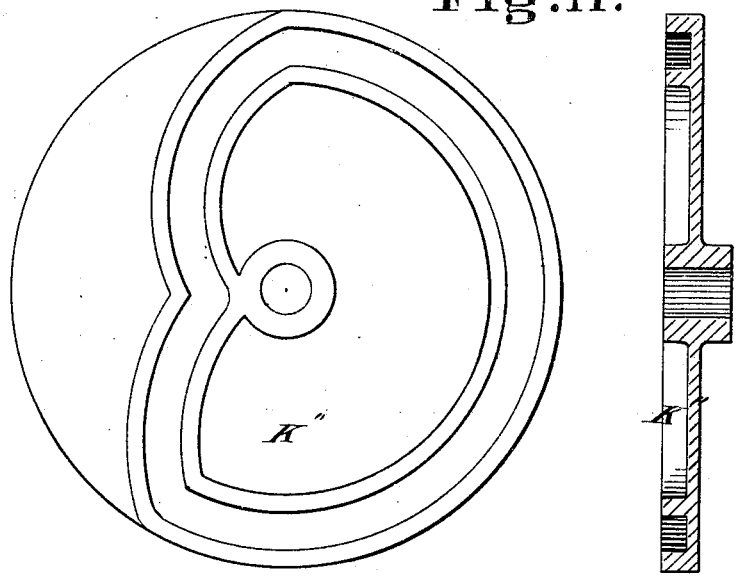
Figure 12:
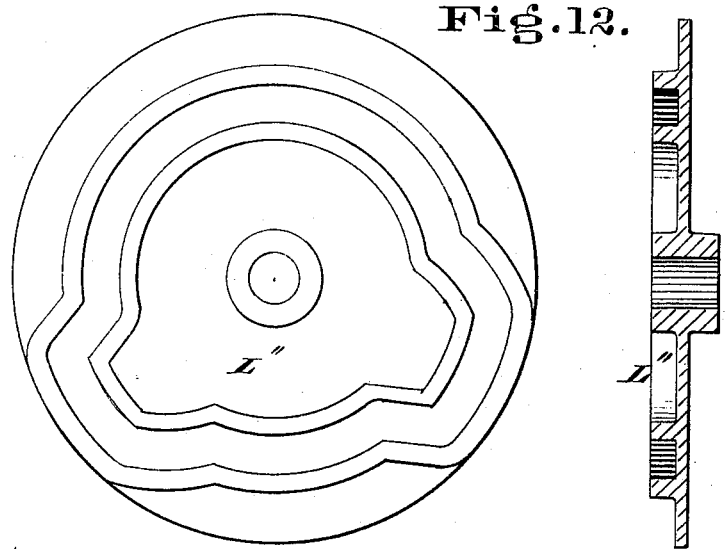
Figure 13:
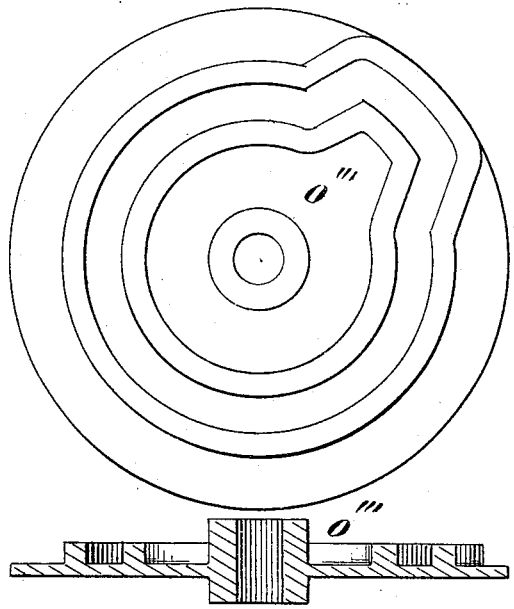
Figure 14:
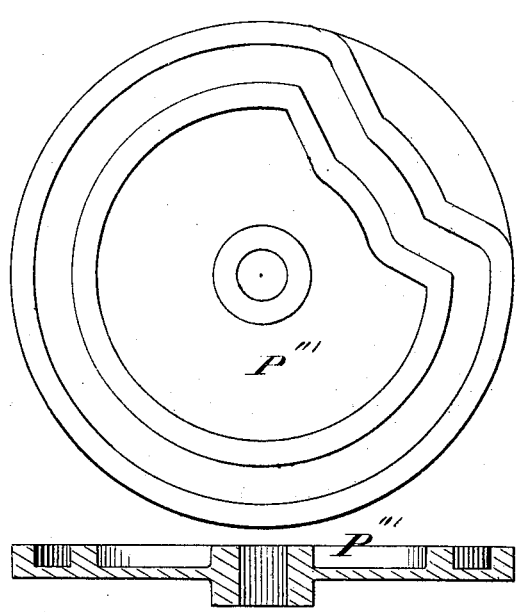
Figure 16:
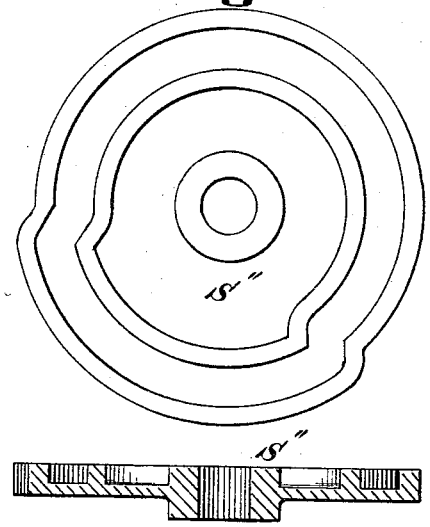
Figure 17:
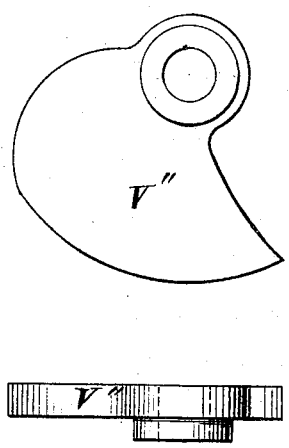
Figure 18:
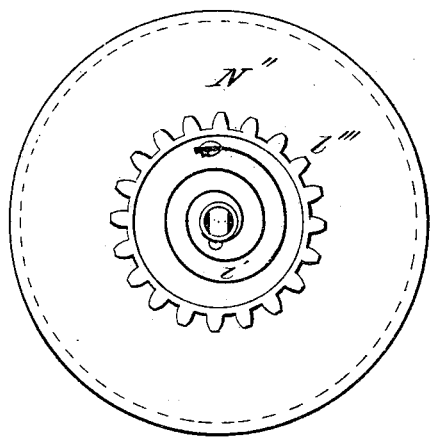
Figure 19:
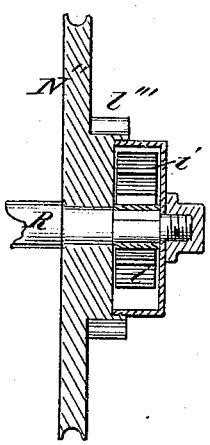
Figure 24:
Figure 25:
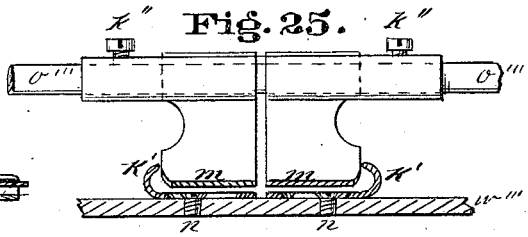
Figure 26:
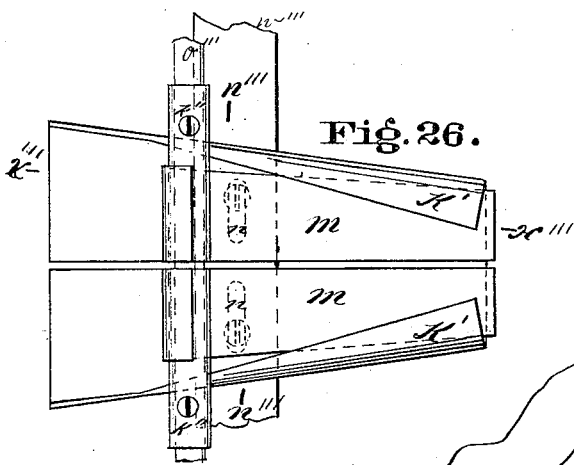
Figure 27:
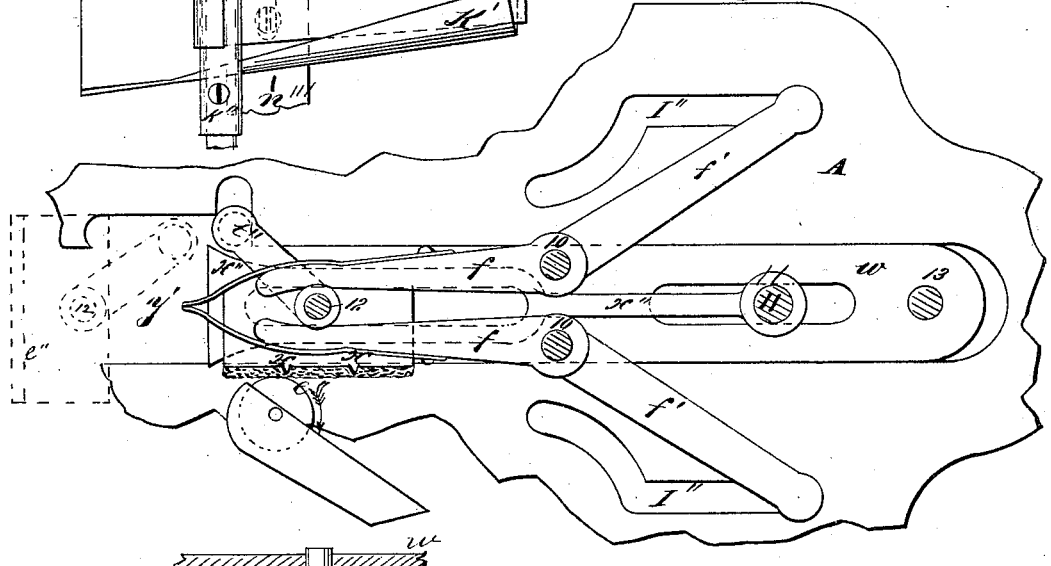
Figure 28:
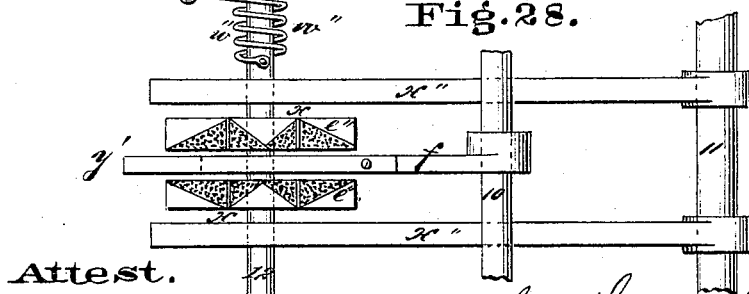
Figure 29:
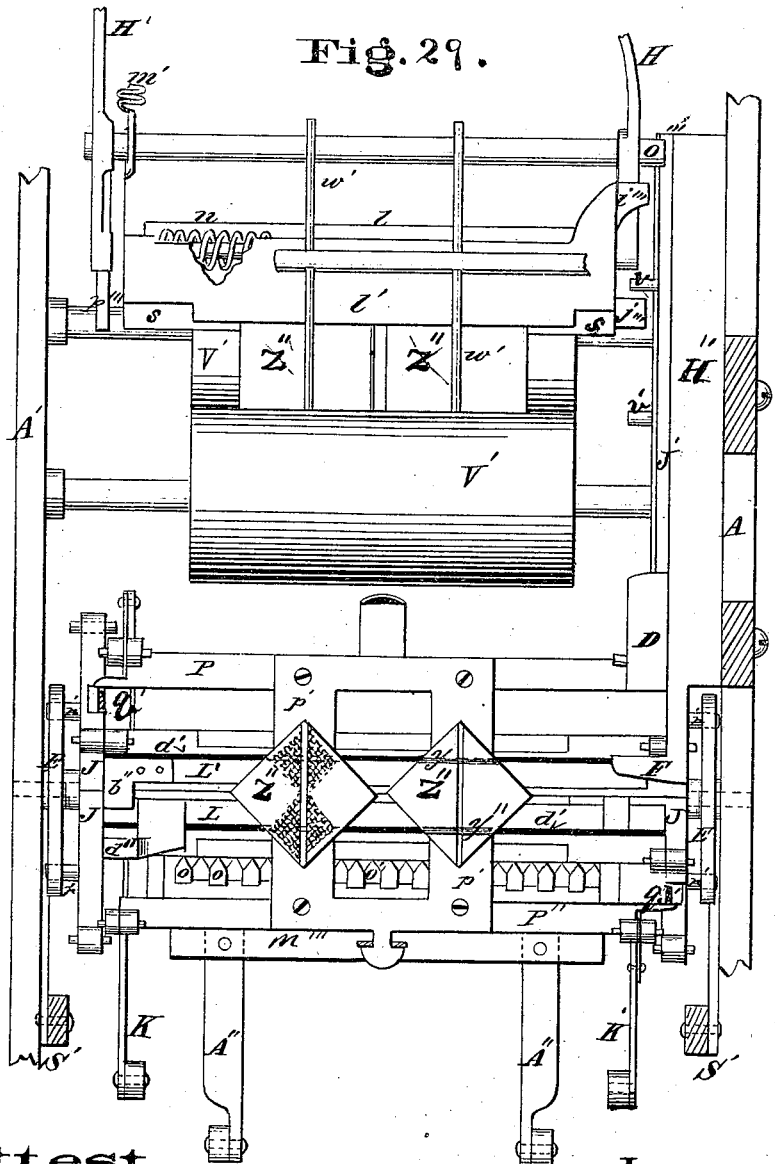
Figure 30:
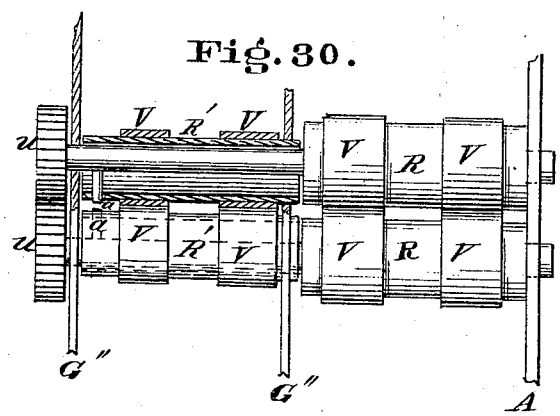
Figure 31:
Figure 32:
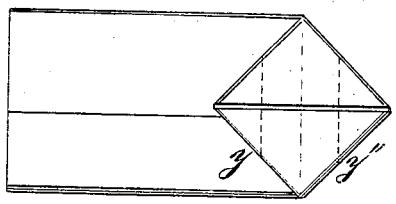
Figure 33:
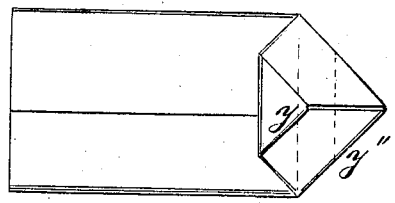

Figure 1 is a front side elevation of my machine. Fig. 2 is a rear side elevation. Fig. 3 is a transverse section, showing the general position of the parts. Fig. 4 is an enlarged transverse section of the jaws and principal mechanism for folding the bottom and severing the tube. Fig. 5 shows the location of the cams on main shaft. Fig. 6 is a face view of the guide-plate for the gripers that transport the bags from the machine. Fig. 7 is a view on line $y''' \, y'''$ of Fig. 6. Fig. 8 is a cross-section of the gripers. Fig. 9 is a face and edge view of the cam for operating the mechanism that shapes the end of the tube and applies the paste. Fig. 10 is a face and edge view of the cam that operates the gripers. Fig. 11 is a face and section of the cam that operates the paste-fountain and roller. Fig. 12 shows the face and section of the cam that operates the jaws. Fig. 13 shows the face and section of the cam that operates the second folder. Fig. 14 shows the face and a section of the cam that operates the first folder. Fig. 15 is a view of the face and a section of the cam that operates the blade for severing the tube. Fig. 16 shows the face and a section of the cam that operates the stop and release of the feed-rollers. Fig. 17 is a view of the face and edge view of the cam that operates the mechanism for holding the paper in position while the first and second folds of the bottom are being made. Fig. 18 shows the spring for driving feed-rollers, with face view of the spur-wheel for winding it up and the pulley for driving the delivery-rollers. Fig. 19 is a cross-section of Fig. 18. Fig. 20 is a top view of the floating expander and guide-bars for operating inside the tube. Fig. 21 is a section on line $v''' \, v'''$ on Fig. 20, and also shows a cross-section of rollers R, Y'', and Q'', and their position, as shown in Fig. 3. Fig. 22 is a top view of the severing-blade. Fig. 23 is a cross or end section of Fig. 22. Fig. 24 is a cross-section on line $x''' \, x'''$ of Fig. 26. Fig. 25 is a section on line $n''' \, n''$ of Fig. 26. Fig. 26 is a top view of the device forming the paper into a continuous tube. Fig. 27 is an enlarged view of the mechanism for shaping the end of the tube and applying the paste. Fig. 28 is a side view of Fig. 27, showing a face view of the paster. Fig. 29 is a top view of the jaws, gripers, delivery-rollers, and all the attachments to the jaws, as shown in enlarged section, Fig. 4. It also shows the ends of the tubes formed in proper shapes to receive the paste, and for the turning of the bottom folds, paste being applied to one. It likewise exhibits the gripers conducting bags into the delivery-rollers. Figs. 30 and 31 are elevation and sections of my feed-rollers for bags of different sizes. Figs. 32, 33, 34, and 35 represent the folding in different stages.

My invention relates to that class of paper-bag machines designed for the manufacture of satchel-bottom paper bags; and it consists, first, in the construction and arrangement of external and internal folding-plates with lateral adjustment, so that, by drawing a continuous sheet of paper through them lengthwise, its edges are gradually turned over and together until they lap, thereby forming a continuous tube of any desired diameter; second, in the arrangement of two or more of said folders, so that several tubes can be formed at the same time; third, in passing the tubes directly from the forming-plates through compressing-rollers, and through a heated chamber to dry the seam; fourth, in the construction and arrangement of adjustable external and internal guide-bars, and internal expanding-bars, to expand and open the end of the tube; fifth, in the feed-rollers, provided with adjustable bands, to adapt them to feeding-tubes of different widths; sixth, in the take-up spring for driving the feed-rollers; seventh, in the construction and arrangement of a back-gear-stop disk for stopping and releasing the feed-rollers at unequal intervals; eighth, in the constructions of jaws hinged between the feed-rollers, and the arrangement of the mechanism attached to them for folding the bottoms of the bags for severing the tubes; ninth, in the spreader-arms to the end of the tube in shape for folding the bottom; tenth, in the hinged bars for delivering the bags to the gripers; eleventh, in the construction and peculiar operation of the folders for folding the bottoms of the bags; twelfth, in the reciprocating and rocking paster, and the sponge-rubber pad for applying the paste; thirteenth, in the arrangement and operation of fingers for holding the bottom while its folds are being made; fourteenth, in the combined reciprocating paste-roller and paste cup or fountain for applying paste to the paster; fifteenth, in the gripers for seizing and conveying away the bags; sixteenth, in the devices for operating and controlling the gripers; seventeenth, in devices for feeding simultaneously for different-sized bags.

To enable others to make and use my invention, I will now particularly describe it in detail.

Similar letters refer to similar parts throughout.

The frame of the machine A and A' consists of side plates of suitable shapes and dimensions, to provide for proper bearings and supports for all the parts of the machine, and are connected together with transverse bars at suitable points.

First, the rolls of paper of which the bags are to be made are placed on spindles I and I', Figs. 1, 2, and 3, transversely journaled in the frame of the machine at a required distance from each other. They are placed one above the other, as shown, to allow the upper rolls of paper to overlap the lower rolls, without interfering with each other, the object being to provide room required for forming the number of sheets of paper into tubes necessary to fill the whole space.

The paper starts from the rolls, as indicated by dotted lines in Fig. 3, passes around guide-rollers D', which have under them cups $k'$ for holding paste, and in those cups are distributing-rollers O'', which connect with the rollers D', and apply paste from the cups $k'$ to the edge of the paper in a proper manner for pasting the seams in the tubes. The paper passes from the guide-rollers D' through the forming-plates K' and $m$, of which Fig. 26 is a top view, Fig. 25 being a section on line $n'''$ $n'''$, and Fig. 24 a section on line $x'''$ $x'''$ of Fig. 26. The plates K and $m$ are secured to transverse bars $o'''$ and $n'''$, with set-screws $n$ and $k''$ in a manner that they can be adjusted laterally, so as to form tubes of different widths. The paper enters the wide end of the former, and is drawn between plates $k'$ and $m$, and the outer curved edges of the plate $k'$ gradually turn the edges of the paper over the plates $m$ as it approaches the narrow end, when both edges of the sheets of paper are brought together with the pasted edge over the other, the lap being the required width of the seam in the tube. The upper and lower sets of forming-plates are arranged with their narrow ends directed to and terminating in one common horizontal line, so that the tubes can all enter the compressing and carrying-rollers O' and O', which serve to compress the tubes and their seams and draw the paper from the roll through the forming-plates. They likewise carry the tubes through or between a series of pipes, T, which are heated with steam or hot air for the purpose of drying the paste in the seams. The tubes, thus completed, are from thence carried through adjustable guide-bars on each edge outwardly, and over adjustable guide-bars and expanding-bars inwardly, an enlarged view of which is seen in Figs. 20 and 21. Fig. 20 is a top view, and Fig. 21 a longitudinal section on line $v'''$ of Fig. 20, showing also position of rollers R, Y'', and Q'' in section, as seen in section, Fig. 3, the dotted lines indicating the line of the tube in passing over the expander. The parts that are shown also in Fig. 3 to perform the internal work in the tube are attached to a plate, $t$. The guide-bars $e'$ are crossed in the shape of an $x$, and secured to plate $t$ with a swivel on a set-screw, $c'$, in a manner that their ends can be varied in their distance from each other to suit the width of tubes through which they are to pass. The functions of those bars are to assist the outward guide-bars $u'''$ in conducting the tubes to their proper places, and also hold in their proper place the expanding-bars $e$, one of which is secured to plate $t$, as shown in Fig. 21. The two bars are hinged or pivoted together about their longitudinal center, as shown, and are bent so as to allow their ends to be open, the hinge permitting the free opening or closing of either end, the top end opening as the bottom is closed, and vice versa. The jaws, Figs. 3 and 4, operate the rollers Y'', closing them when they open and opening them as they close; and, as the lower ends of the bars $e$, Figs. 3 and 21, are between the rollers Y'', the opening of the jaws at the proper time closes the lower end of the expanding-bars and opens the upper end; and since these bars are inside the tube, the tube is therefore opened, as shown by dotted lines, Figs. 3 and 21, for the entrance of the mechanism that forms it in shape for the reception of the paste.

Pivoted in plate $t$ are small friction-rollers $c$, to limit the end movement of the plate. The tube passes between these rollers and the outer rollers Y'' and Q'', revolving them by its friction in passing. The outer guide-bars $u'''$ are secured to bar $t'''$ with set-screws, as shown in Figs. 20 and 21, for lateral adjustment to suit the width of tubes. The feed-rollers R and R, Figs. 3 and 32, for carrying the tubes at intervals, as required for the various operations, are provided with movable rings V, held to their place by set-screws or any other known way, and are of such a width as to admit of their being adjusted to correspond with the outer guide-bars $u'''$ and inner expanders.

The guide-bars pass between the rollers through open spaces between the rings V, and likewise do the expanders. The rings are brought firmly together by a strong tension, and between them the tubes are entered as follows: The expanders being placed between the rollers, in the open space between the rings V, the tubes are then passed over these expanders, and entered between the rings V, which, by their tension, draw the tubes over the expanders, and pass them beyond, by the stiffness of the tube, to the required point. After the tubes have entered the feed-rollers R, at the proper time the rollers are allowed to be revolved, to a limited extent, by the release of disk G, Fig. 1, to which is attached a spur-wheel, $i$, meshing in spur-pinion $u$ on the shaft of the roller R. The release is effected by the action of the cam S'', Figs. 5 and 6, which gives two motions to the lever or rock-shaft 9 at unequal intervals to each revolution. On this rock-shaft is an arm, Z, rigidly secured, and to its upper end is pivoted a bar, Z', which has a forked end resting on the outer end of the stud, on which disk G is supported; and on the side next to the disk G it has a lug on which one of the pins $x'$ in disk G rests, which stops the rotary motion of the disk. These pins are arranged alternately near and farther from the center of the disk, and at a proper distance for the required motion.

By the action of the cam a back-and-forth end motion is given to the bar Z' at intervals, thus moving the lug on which pin $x'$ is resting from under it, and directly in the road of the next pin $x'$, which stops the disk at the proper place. The disk being thus released allows the feed-rollers R to revolve. They are driven by a coiled spring, $i$, which is secured to the shaft of one of the rollers R, and also to the spur-wheel $l'''$, which is loose on the same shaft. To this spur-wheel is secured pulley N'' for driving the delivery-rollers.

Fig. 18 is a face view of spur-wheel and pulley, showing the spring attached to spur-wheel and shaft of the roller, spur-wheel and pulley playing loose on the shaft. Fig. 19 is a section through Fig. 18. The spur-wheel $l'''$ is driven by an idle-wheel, C, which is driven by a spur-wheel, X, on the main shaft $r$, thereby winding up the spring $i$ at the same ratio that it is allowed to carry the feed-rollers. The object of the spring movement is to save time in making the movement, to move with greater precision, and to provide a better system of regulating the machine for making the different sizes of bags, which is accomplished by simply changing the gear-wheels on main shaft and stop-disk G to smaller or larger.

Previous to the release of the feed-rollers the jaws J are opened by the action of the cam L'', Figs. 5 and 12, and dwell but a short time. In connection with cam L'' are two rock-cams, E, Fig. 4, pivoted on the frame A and A' at $z'$, which have slotted holes in each of their sides playing over lugs $r'$ secured in the heads of the jaws J. To the lower end of cams E is pivoted link S' at $z''$, which connects E with arms S, which are rigidly secured to rock-shaft 5, which, in turn, has a rigid arm working in cam L''. Thus, by the action of the cam L'', an end motion is given to links S'. Now, since the cams E play on the pivot $z'$, the rocking of them by the link S' alternately raises and depresses the slotted parts of them playing over the lugs $r'$, and as these lugs $r'$ are firmly fastened to the jaws the rocking of the cam alternately opens and closes them, as required. Immediately after the opening of the jaws J the feed-rollers R are released, and the tubes are carried forward up through the jaws, as shown by dotted lines in Fig. 3, far enough for the formation of the bottom above them. The tubes are met above the jaws by the advancing bottom former and paster, which have a reciprocating motion given them at the proper time by the cam E acting through its connections. (See Fig. 3.)

The paster and former are constructed as follows: In the frame A and A' there are slide-plates $w$, in which are arranged transverse shafts 10, 11, 12, and 13. Shaft 13 serves as a tie and carrier, and at each end of it, and outside the frame, are attached connecting-bars N', which connect with arms N on rock-shaft 3, rigidly secured to the shaft, which arms are operated by cam E''.

An enlarged view of the mechanism for forming and pasting the bottom of a single bag is shown in Fig. 27, and the same is duplicated for each and every tube to be operated upon at the same time, and is secured to shaft 12 in its proper place. A side view of the same is shown in Fig. 28. Shaft 12 is journaled in plates $w$, and carries the pasters $e''$, which are secured to it by set-screws or otherwise. The pasters consist of two cases or shoes containing sponge-rubber in the proper shape and dimensions for applying the paste to the bottom of the bag. The shape of the rubber is shown by the shading of $e''$, Fig. 28. A creasing-blade, $x$, is secured to the case, and serves to crease the paper where the fold of the bottom is to be made. On one end of this shaft 12 is secured a short arm, $t''$, with a friction-roller pivoted to it, and resting in a notch in the frame through which plate $w$ slides. On the other end of the shaft is a spiral spring, secured one end to the shaft and the other to the slide-plate $w$, for the purpose of giving a rotary tension to the shaft, and holding up the arm $t''$, thereby causing it to take its intended course outward when the former is going down. This will be seen by the notch through which the friction-roller works, and which turns the shaft on which the pasters are secured one-fourth of a revolution, putting the pasters in position to apply the paste to the bottom of the bag. Shafts 10 are journaled in plates $w$, as shown, and have secured to them the parts that form the end of the tube in proper shape to receive the paste. Arms $f$ are secured to shafts 10, and have each secured to them a light thin spring projecting below their lower ends, as shown, with an inward curve which brings the two springs together at $y'$, Figs. 3 and 27. On one end of each shaft 10 is firmly secured an arm, $f'$, having a friction-roller pivoted to the upper end. This roller projects through guide-slots I'' in the frame, which slots vary in their course to give the required motion to the arms $f'$.

Since shafts 10 are the pivot-centers of arms $f$ and $f'$, their extreme ends move correspondingly in opposite directions, and as the arms $f'$ are brought nearer together as they reach their downward limit, the arms $f$ are proportionately thrown apart, thereby spreading the end of the tube by carrying and forcing its sides in opposite directions by means of the springs $y'$, which are introduced into it in its expanded state, given by the expander $e$. Shaft 11 and its attachments are operated independent of the former and paster, and constitute that part of the mechanism termed the "holder," which serves to hold the form given to the tubes by the springs $y'$ while the folds of the bottom are being made. It is operated by the action of the cam $v''$, Figs. 5 and 17, in its downward movement, and by the action of a spiral spring, $r'''$, Fig. 2, it is quickly carried up at the proper time. The shaft plays loosely through slots in the slide-plates $w$, and is connected by rods $w'$ to arms $u$, which are secured to rock-shaft 4, Figs. 1 and 2. On said shaft is also secured the arm on which cam $v''$ operates. The spiral spring $r'''$ is secured one end to the arm $u$, and the other to the frame A', Fig. 2. The holders $x''$, Figs. 27 and 28, are secured to shaft 11, and pass between shafts 10. They are slotted to play over shaft 12, and mounted to operate on each side of the pasters $e''$, as shown in Fig. 28. They follow the downward movement of the pasters to their limit, and rest on the outer corners of the bottom, when in the stage shown in Fig. 29 at each edge of the tube, and extend over the corners to the lines of the creases for the folds, and remain until the paster and former have passed up and the folds of the bottom are made, when they are released by the cam and carried up quickly by spiral spring, $r'''$, Fig. 2. A paste-roller, 19, Fig. 3, is mounted in a cup for holding paste. The cup is secured to a movable or sliding plate mounted in guide-rail G', Fig. 3. This plate is connected with cam K'', Figs. 5 and 11, by means of a link and arms, the arms being firmly secured to rock-shaft 2. (Shown in Fig. 3.) At the proper time the slide carrying the paste-cup and roller is carried down and back, which movement passes the paste-roller over the sponge-rubber in the pasters $e''$, which are placed in position for that purpose by the action of the short arm $t''$ on shaft 12, thereby apply paste to the rubber from cup $q$. The roller revolves by friction in passing the rubber.

The operations of the above-described mechanism for forming and pasting the bag-bottoms are as follows: The advancing ends of the tubes in the open or expanded state given them by the internal expanding-bars $e$, Figs. 21 and 3, are met by the approaching former and paster, and the springs $y'$ enter the open end of the tubes. As soon as the springs have entered the tubes the jaws J are firmly closed on them, and the downward and outward motion of the springs $y'$ gives to the ends of the tubes the proper shape for pasting and folding what is called the satchel-bottom. This stage of formation is shown in Fig. 29 at Z''. Springs $y'$ are followed closely by the pasters $e''$ and holders $x''$, and as they come in contact with the above-described form of the end of the tubes the sponge in the pasters applies the paste in the proper shape for pasting together the folds of the bottoms. Heavy shading indicates the paste as applied. (Shown at Z'', Fig. 29.) Blades $x$ in the paster leave creases in the paper through the pressure given them by the cam, there being grooves in the bars L to correspond with the creasing-blades. These creases determine the width of the folds. The forming-springs and pasters are then carried up, while the holders remain in their position, keeping the paper in place until the folds are made. The bottom folds are made by means of folding-blades $p'$, Figs. 4 and 29, which are secured to bars P and P', said bars being pivoted at each end, as shown at $g'$, Fig. 4, to the upper part of carrying-frames 18. The lower ends of the cross-rails $b'$ are pivoted to the heads of the jaws J at $z$, Fig. 4. The frames 18 are operated by the cams P'''' and O''', Figs. 5 and 13 and 14. Cam P'''' has an arm connected to it with a friction-roller playing in its groove, the arm working loose on shaft 7. To this arm is secured another arm, to which rod K is pivoted, Fig. 29. Rod K is connected to the carrying-frame 18 by a pin in the frame projecting through a slotted hole, $d$, Fig. 4, this slot being equal to half the distance the jaws open, as shown, Fig. 4, for the purpose of allowing the jaws to open without interfering with the folding-bar P. Rod K is pivoted to lever $s'$ at $i'$, and lever $s'$ is pivoted to the jaws J at $g'$, and extends under bar P, serving to raise said bar, and thereby raising the folding-blades $p'$, for a purpose hereinafter set forth. Bar P'' is arranged and operated in the same manner as bar P, and is connected with cam O''' by two arms secured to rock-shaft 7, and also by rod K', one of said arms working in the cam and the other pivoted to rod K', which is connected to frame 18, in the above-described manner as rod K. The folding-blades $p'$ are held down by springs $m'$ and $m''$, which are secured to frames 18, and resting under an outer lug on bars P and P'. Springs $q'$ are secured to the jaws, and serve as a guide to the folding-bars. On the end of the bars P and P'' are projecting lugs, (shown at $q'$, Fig. 29,) where the upper ends of the guide-springs can be seen.

The operation is as follows: By the action of the cams the rods K and K' are given an end movement back and forth at certain required intervals, thereby carrying the upper part of frames 18 in like manner, thus operating the folding bars and blades. The motion of folding-bar P is in advance of P''', and is termed the first folder, and P''' the second. In the forward motion the bars are raised by the action of the small levers $s'$, and are held up by springs $q'$ until the blades $p'$ have turned the corners that form the laps of the bottom folds entirely over. The lugs then drop over the springs, and the tension-springs press the folds together and hold them until the advancing gripers take their position, when the bars are carried directly back, forcing springs $q'$ back by the beveled sides of their lugs, thus passing springs $q'$, and each resuming its former place. The object of the peculiar motion given the folding-blades is for the purpose of keeping the blades at a proper distance from the crease of the fold, so as to allow the paper to freely and gradually yield to the operation. After the tubes have been prepared for the folds to be made, the holders $x''$ keeping their position, the first fold is made, shown at $y$, Fig. 33. Followed by it is the second fold, shown at $y''$, Fig. 34. The folding-blades rest on the folds, held by tension-springs, a short time, while the holders are released and carried up by springs $r'''$, Fig. 2. The gripers, being in readiness, now take their position on the folds, when the folding-blades are carried directly back to their former places. The gripers serve to convey the bags from the jaws J to the compressing and delivering rollers $v'$. They are given their forward motion by cam F, Figs. 5 and 10, and are carried back by spiral spring W. They are constructed as follows: Bars H and H', shown broken off, Fig. 29, are secured together by transverse bars, thereby forming a rigid frame, which is pivoted to arms $y'$, Fig. 3. Arms $y'$ are themselves secured to a shaft journaled in the frame, as shown. Said shaft has two short arms, $m$ and $y$, secured to it at one end, shown in Fig. 1. Hence the rocking motion given this shaft by the cam and spring serves to carry the frames pivoted in $y'$ forward and back. In this frame are arranged the gripers, of which a top view can be seen in Fig. 29. The jaws of the gripers are denoted by $l$ and $l'$. S is their tongue. A spring, $n'$, holds the jaws firmly closed on the tongue S, and $m'$ is a spring for holding up the mouth of the gripers. A transverse section of the gripers is shown in Fig. 8, and consists of three blades hinged together at one side, with a tension-spring in their hinge, connected with the two outer blades, thereby holding their opposite edges firmly against the middle blade. The hinge allows their lower or opposite edges to open and leave the middle blade free and isolated from them. It will be seen that the middle blade projects a little below the outer blades $l$ and $l'$. A lug, $i'''$, extending up from the jaw $l'$, serves to open it, and the jaw $l$ is opened by a lug, $j'''$, on the lower part. A guide-lug, O''', is used for the frame carrying the gripers; and a guide-plate, H'', for the same purpose, is secured to the frame of the machine. A face view of this guide-plate is shown in Fig. 6, and Fig. 7 is a section on line $y''' y'''$ of Fig. 6.

D is a projecting rail or rib forming a support and track for the forward motion of the griper-frame, lug O''', Fig. 29, being the support of the frame on rail D''. D is a projecting lug, shown in Fig. 29, to open the jaws $l'$ when taking the bag, and F a lug to open the jaw C. J' is a self-acting switch-bar for changing the track for the back motion of the gripers. It is pivoted at its upper end, as shown, which allows its lower end to play up and down, as indicated by dotted lines, Fig. 6. A pin and slotted hole, $c'$, serve to limit its movement during the forward motion of the gripers. Lug O''' passing on rail D'' raises bar J', and on passing its lower end the bar falls by its own weight, with its pivot resting on rail D'', thereby forcing the lug O''' to pass over said bar, which movements raise the gripers up and carry them in a proper manner to perform their work. Lugs $v$ and $v'$, Figs. 3 and 29, serve for opening the gripers, while conveying bags to the delivery-rollers V'. The cam F'' operating the gripers has a single wall, as will be seen by Fig. 10; hence it only carries the gripers in their downward movement, and they are carried back by spring W. To the shaft 8 is secured arm Q, Fig. 1. Rod Q' connects arm Q with arm M, thereby completing the connection of cam F'' with the gripers. The spring W is connected to the wheel W' by a cord secured to it, and another cord around said wheel W is fastened to the arm Y.

Figure 34:
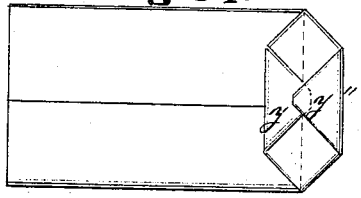
Figure 35:
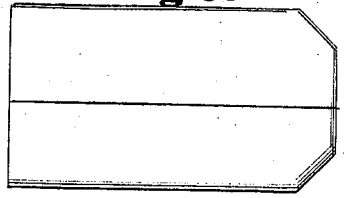

The operation is as follows: The gripers are carried forward by the cam at the proper time, and just before they reach the bags lug $j'''$, on jaw $l$, is engaged and held by lug F, and at the same time lug $i'''$ is drawn down by passing under lug D. The forward motion of the frame carries the tongue S against the lug $l''$, shown in Fig. 29, thereby placing the lower edge of the tongue S across and on the center of the bottom of the bag, as shown in Fig. 34, the dotted line showing the line on which the tongue rests. As soon as this is done a lug, $p'''$, on frame-bar H' comes in contact with lug $d'''$ on bar L, and still farther movement pushes back said lug, thereby raising the inner edge of the bar L. Now, since bar L' has a lug, $b''$, extending over bar L, the raising of L raises L' also, and as those bars L and L' are under the bag on which the tongue of the gripers rests, being on the center line of the bottom, the bottom will be doubled up against the sides of the tongue. By this time the forward movement has carried $i'''$ and $j'''$ by lugs F and D, and the spring $n'$ is allowed to close the jaws, thus catching the bottom of the bags firmly between them and the tongue. Cam F'' then releases its hold and allows spring W to carry the gripers up. At this time jaws J are opened and the feed-rollers are released; and since the feed-rollers and the gripers are both operated by springs at this point, they act in perfect harmony in carrying up the tubes. At the proper point the rollers are stopped, which is determined by and in accordance with the length of the bag to be made. The jaws are then closed, and the tubes are severed by a blade arranged in one of the jaws, as hereinafter described. The jaws again open and the gripers with the bags are quickly carried back. Lug O''' passes over the top of switch-bar J, and gripers carry the bags to a position over the delivery-rollers V', while the conducting-rods w' serve to guide them, mouth foremost, directly into or between said delivery-rollers. The rods w' are secured to a shaft journaled in the frame of the machine, shown in Fig. 3. A portion of the shaft, with conducting-rods attached, can also be seen in Fig. 29. The rods are operated by the action of the gripers and a shaft in the griper-frame, over which one of them extends, as shown in Fig. 3. Lug O''' now drops off of switch-bar J' on guide-rail D'', and the gripers are given a forward movement by the action of cam F''; and as the griper comes down, the bags being conducted mouth foremost into the delivery-rollers V' by rods w, lugs i''' and j''' are caught by lugs b and v', which open the jaws of the gripers, and the bags are carried through the rollers, thereby compressing them firmly, uniting the seams of the bottoms, and putting them in complete merchantable shape.

The blade m''' is arranged in one of the jaws J, with each end in a slide, Figs. 4 and 29, and plays through an opening in said jaw, and in a corresponding groove, o'', in the other jaw, (see Fig. 4.) It is operated by the action of cam R'', Figs. 5 and 15, properly connected with it by means of rock-shaft 6 and the necessary arms for giving it a back and forth motion. The construction of this severing-blade consists principally in providing a bar or plate with a series of thin, sharp-pointed, lancet-shaped thrust-cutters, arranged alternately, face to face, in an unbroken line of cutting-edges, for the purpose of severing paper or other material by a thrust, point foremost. The cutters may have a sharp knife-edge or a rough sickle-edge, as either will meet the requirements; but for a smooth and clean cut the sharp knife-edge is preferable. Fig 22 is an enlarged top or side view of the blade, showing a portion of its length broken away.

The cutters o and o' are secured to a bar m''', by screws through o, which overlap o', thereby securing them also. Fig. 23 is a transverse section of the blade, on a line through the centers of cutters o and o', from their points to bar m''', and through it on the line of the cutters o, thereby showing the manner in which the cutters are secured to the bar. It will be seen that the cutters are brought to an edge by a bevel on one side, thereby leaving one side with a straight and level surface; the object being to allow them to overlap each other and bring their cutting-surface in one common line, thereby completely connecting the cutting-edges. They are connected to the bar m''' in a convenient manner to be detached for sharpening or repairs.

The structure of my machine is such that by the simple lengthening out of the jaws, cutter, and folding flaps, and the duplication of the feeding, spreading, and pasting mechanism, two or more bags may be made at the same time. This is fully shown in the drawings hereto attached; but by constructing the feed mechanism so that it may be adjusted to feed at different speeds, bags of different sizes may be simultaneously made, and the feed mechanism of this description is shown in Fig. 30, though I do not confine myself to that particular structure of the feed mechanism, because it may be differently constructed and still accomplish the same purpose.

The rollers R and R', Fig. 30, are arranged for carrying the tubes in required ratio for making two different sizes of bags at the same operation. This is accomplished by providing rollers R and R', Fig. 30, of greater and less diameters. It will be seen that the larger rollers R have a shaft or arbor through their centers, while the lesser rollers R' are a shell, with the shaft passing through them outside their centers, shown more fully in cross-section, Fig. 31. The shafts are journaled in the frame of the machine, and the rollers R' are journaled in suitable bearings in bars G'', which are permanently secured to transverse bars of the frame. The rollers R' are driven by lugs or pins a, secured to the shafts of rollers R. These lugs play through a hole or notch in the shell, as shown in Figs. 30, 31, thereby giving the same number of revolutions to all the rollers, and hence the rollers carry the tubes in proportion to their circumference. And as the rollers O and O' are required to carry the paper tubes at a corresponding speed with the feed-rollers R and R' their dimensions and number of revolutions likewise correspond.

Having described my invention, what I claim as new is—

1. The folding-plates k' and m, constructed in parts laterally adjustable, as and for the purpose hereinbefore set forth.

2. The folders, composed of plates k' and m, arranged alternately above and below each other at their wide ends, with their narrow ends terminating in one common horizontal line, substantially as for the purpose set forth.

3. The expanding-bars e' mounted upon the bar t, substantially as shown, to constitute an adjustable former for the interior of the tube, as set forth.

4. The adjustable external guide u''', combined with the internal adjustable former-bars e', substantially as set forth.

5. The expander e, substantially as set forth, combined with the rollers R R and Y'' Y''.

6. The combination of the expanding-bars $e$, with the rollers Y'' at the ends of the vibrating arms J J, for the purpose set forth.

7. Rollers R and R, provided with movable rings $v$, for the purpose set forth.

8. Combined with the feed-roller R, the spring $i$, to take up the continuous motion of the driver $l'''$, combined with a suitable intermittent stop, substantially for the purpose set forth.

9. The disk G, provided with the lugs $x'$, arranged alternately nearer and farther from its center, combined with the feed-rollers, take-up springs $i$, and bar $z'$, substantially as and for the purpose set forth.

10. The jaws J, hinged at point $g$ between the feed-rollers R, and having attached to and moving with them the bars L L', folders P P', and knife $m$, mechanism for holding, folding the bottoms of the bags, and for severing the tubes, substantially as and for the purpose set forth.

11. The folding-bars P and P'', pivoted in swinging frame 18, hinged to the jaw-levers J, and arranged and operated substantially as and for the purpose set forth.

12. The reciprocating arms $f$ provided with springs $y'$ to open and spread the end of the bag, substantially as and for the purpose set forth.

13. Folding-bars L and L', pivoted to and moving with jaws J, and operated substantially as and for the purpose set forth.

14. Shaft 12, arm $t''$, spring $w''$, and pasters $e''$, combined with slotted frame A, and operated substantially as and for the purpose set forth.

15. The adjustable expanding bars or former $e'$ $e'$ pivoted to the bar $t$, which is provided with rollers $c$ $c$, and combined with the rollers Q'' Q'' Y'' Y'', whereby said former is kept in place, as set forth.

16. The reciprocating holder $x''$, combined with reciprocating shaft 11, and sliding slotted plate $w$, arranged and operated substantially as and for the purpose set forth.

17. The blades $l$ $l$ S, to constitute a three-bladed griper, as described, to seize separately the bottom folds of the bag, in the manner described, and convey said bag away from the jaws J, as set forth.

18. Combined with the gripers $l$ $l'$ S, and reciprocating frame H, a cam, H'', to guide the movement of the same forward, and a weight or spring, W, to move the same back, substantially as and for the purpose set forth.

19. Combined with the griper $l$ $l'$ S, the guide plate H'' and guide-rods $w'$, constituting a conveying-basket, arranged and operating to deliver the bags to the pressing-rollers, in the manner set forth.

20. Severing-blade $m''$, constructed with a series of sharp-edged or lancet blades, set face to face and overlapping, so as to present a continuous cutting-edge, and operated in the manner and for the purpose set forth.

21. In combination with the operative mechanism of a paper-bag machine, feeding devices operating at different speeds, whereby the said machine may simultaneously produce bags of different sizes.

JAMES HATFIELD.

Witnesses:
R. D. O. SMITH,
N. B. SMITH.